July 19, 1932.   W. C. NABORS   1,868,020
LOAD CARRYING VEHICLE
Filed Dec. 30, 1930
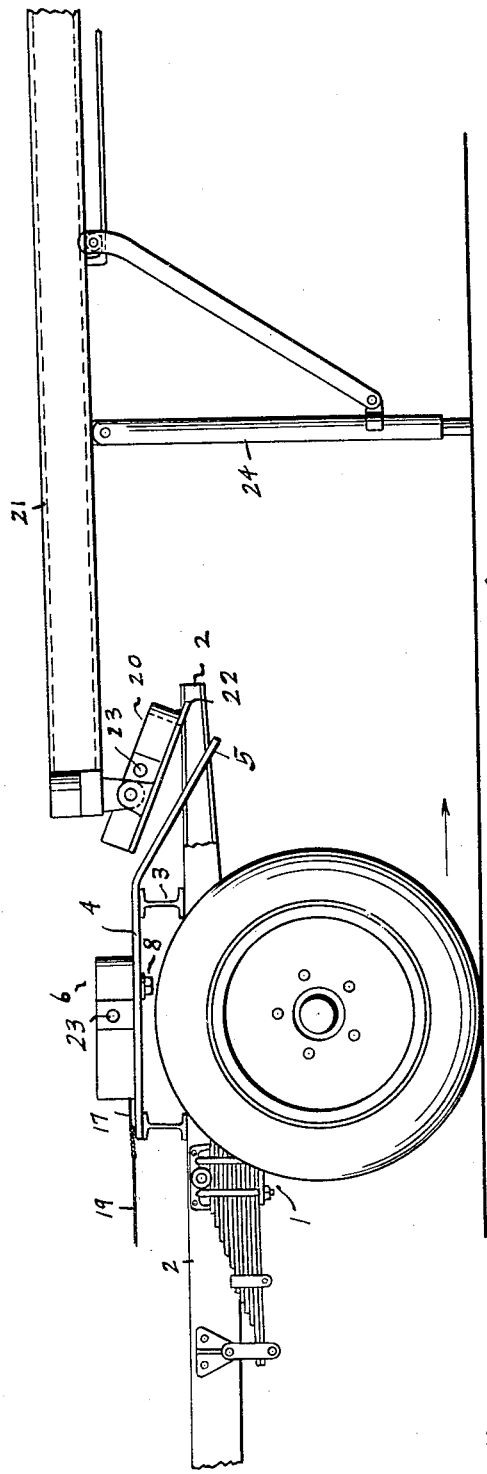
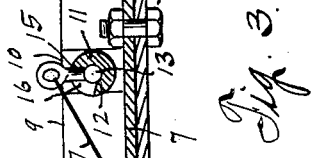
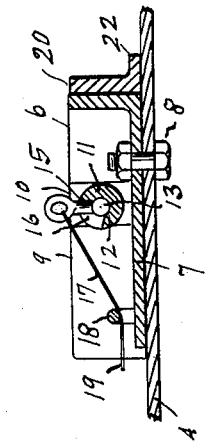
Inventor
William C. Nabors,
By Hardway Cathey
Attorneys Patented July 19, 1932

1,868,020

UNITED STATES PATENT OFFICE

WILLIAM C. NABORS, OF MANSFIELD, LOUISIANA

LOAD CARRYING VEHICLE

Application filed December 30, 1930. Serial No. 505,528.

This invention relates to a load carrying vehicle and has particular relation to novel means for connecting a trailer to a truck or tractor.

One object of the invention is to provide means whereby the tractor may be automatically coupled to the trailer, said coupling means being of such construction that the trailer may be readily uncoupled from the tractor.

A further feature of the invention resides in the provision of cooperating coupling members, one mounted on the rear end of the tractor and the other carried by the forward end of the trailer, said coupling members being of such shape that they may be readily brought into cooperating relation and being equipped with means for coupling said members together to connect the trailer to the tractor, and for uncoupling said members to effect the detachment of the trailer from the tractor.

With the above and other objects in view the invention has particular relation to certain novel features of construction, operation and arrangement of parts, an example of which is given in this specification and illustrated in the accompanying drawing, wherein:

Figure 1 shows a fragmentary side elevation of a tractor and trailer shown in position for coupling them together.

Figure 2 shows a fragmentary plan view partly in section of the coupling members, and associated parts coupled together, and Figure 3 shows a fragmentary sectional view taken on the line 3—3 of Figure 2.

Referring now more particularly to the drawing wherein like numerals of reference designate similar parts in each of the figures, the numeral 1 designates the tractor as a whole having the frame work which includes the side members 2, 2. Mounted on the rear end of this framework are the transverse beams 3, 3 preferably I beams, which are spaced apart and on these beams there is the supporting plate 4 whose rear end declines rearwardly forming the guide apron 5. Mounted on the horizontal portion of the plate 4 there is a coupling member, designated generally by the numeral 6. This coupling member has the bottom bearing plate 7 which rides on the plate 4 and which is pivoted adjacent its rear end, to the supporting plate 4, by means of a suitable bearing bolt 8 whereon said coupling member 6 pivots about a vertical axis. The bearing plate 7 may be of a substantially triangular shape with its pivoted apex pointing rearwardly and the side margins of this plate has the upstanding marginal side flanges 9, 9 whose mid-portions 10, 10, are turned into substantially parallel relation. There is a transverse bearing member 11, between and anchored to said parallel portions 10 said bearing member having an axial bearing 12 therethrough which continues on through said parallel portions 10 and mounted in opposite ends of said bearing there are the dogs 13, 13 whose inner ends work against a coil spring 14 in the bearing 12 and located between said dogs.

Each dog 13 has an upstanding rod 15 connected to the inner end thereof and said rods work in the forwardly converging slots 16, 16 of the bearing member 11, which form bearings for said rods. Suitable flexible members, such as cables 17, 17 are attached to the upper ends of said rods 15 and extend forwardly through the eye 18, carried by the bottom plate 7, and unite in a common cable, or other flexible member, as 19.

There is a rear coupling member designated generally by the numeral 20 which is attached to and depends from the forward end of the trailer framework 21. This coupling member 20 is pivoted to work on a transverse axis and is composed preferably of angle iron shaped to conform to the contour of and to fit closely about the marginal flanges 9 of the coupling members 6. The lower margin of the coupling member 20 has the outwardly extending flange 22 forming a suitable base. The coupling member 20 has the oppositely disposed bearing 23, 23, arranged to register with the bearing 12 when said coupling members are brought into assembled or coinciding position and when in such position, the outer ends of the dogs 13 will project through said bearings 23, to couple said members together.

When the trailer is disconnected from the tractor its forward end may be supported on suitable foldable legs 24 which are pivoted, at their upper ends, to the trailer farmework.

When it is desired to couple the trailer to the tractor said tractor is located in front of the trailer and then run rearwardly and the apron 5 will move under the base 22 of the coupling member 20 and said base 22 will ride up unto the supporting plate 4, thereby elevating the front end of the trailer and causing the legs 24 to clear the ground and the upstanding flange of the coupling member 20 will embrace the corresponding upstanding flanges of the coupling member 6. As these coupling members move into nested or interfitted position the forward diverging sides of the coupling member 20 will force the dogs 13 inwardly compressing the spring 14 and when said dogs come into alignment with the bearings 23 the spring 14 will force the dogs outwardly through said last mentioned bearing completing the coupling operation. The depending legs 24 may then be folded up against the frame of the trailer and there held by any suitable mechanism or device for the purpose.

When it is desired to uncouple the trailer from the tractor the legs 24 may be swung down into vertical position and the cable 19 pulled forwardly by the operator of the tractor. This forward pull will swing the rods 15 forwardly and the slots 16 will cause them to move inwardly toward each other, thus releasing the dogs 13 from the bearings 23 and effecting the disconnection of the coupling members 6 and 20. As the tractor moves forwardly the supporting plate 4 will ride out from under the base 22 permitting the forward end of the trailer to descend until it is supported by the legs 24.

The drawing and description disclose what is now considered to be a preferred form of the invention by way of illustration only while the broad principle of the invention will be defined by the appended claims.

What I claim is:

1. Coupling means for vehicles comprising coupling members mounted on adjacent ends of the vehicles to be coupled and having forwardly diverging sides, guide means associated with one of said members and effective to elevate said other member and guide said members into coupling relation as the vehicles are relatively moved into position to be coupled together, said members being pivoted, one to move on an approximately vertical axis and the other on an approximately horizontal axis, and releasable interlocking means working through the sides of the coupling members for automatically interlocking said members in coupled relation.

2. A coupling device for coupling vehicles together including a support on one of the vehicles having a declining apron forming a guide, a coupling member mounted on said support to pivot on an approximately vertical axis, and having upstanding forwardly diverging coupling means thereon, a coupling member on the other vehicle mounted to pivot on an approximately horizontal axis and having coupling means shaped to fit about said means on the front coupling member, said guide being effective to elevate said last mentioned coupling member and the adjacent end of the vehicle whereon it is mounted and to direct said coupling means into coupling relation, when said vehicles are moved into position to be coupled together.

3. A coupling device for coupling vehicles together including a support on one of the vehicles having a declining apron forming a guide, a coupling member mounted on said support to pivot on an approximately vertical axis, a coupling member on the other vehicle mounted to pivot on an approximately horizontal axis said members having forwardly diverging interfitting parts, said guide being effective to elevate said last mentioned coupling member and the adjacent end of the vehicle thereon it is mounted and to direct said interfitting parts into interfitting relation, when said vehicles are moved into position to be coupled together, and releasable interlocking means adapted to interlock said interfitting parts in coupled relation.

4. Coupling means for connecting a trailer to a tractor, comprising means on the rear end of the tractor for elevating the forward end of the trailer when said tractor and trailer are relatively moved into position to be coupled together, and releasable interlocking means carried by the tractor and trailer, respectively, adapted to interengage, to couple the trailer to the tractor upon such relative movement said interlocking means comprising interfitting parts, yieldably mounted dogs on one of said parts, the other part having bearings to receive said dogs and coacting means effective to withdraw said dogs from said bearings upon the rotation of the dogs.

5. Coupling means for connecting a trailer to a tractor comprising means on the rear end of the tractor for elevating the forward end of the trailer when said tractor and trailer are relatively moved into position to be coupled together, releasable interlocking means carried by the tractor and trailer respectively adapted to interengage to couple the tractor to the trailer upon such relative movement, said interlocking means comprising interfitting parts, one of said parts being mounted to pivot on approximately a vertical axis on the tractor and the other part being mounted to pivot on approximately a horizontal axis of the trailer, yieldably mounted dogs on one of said parts, the other part having bearings to receive said dogs and coacting means effective to withdraw said dogs from said bearings upon the rotation of the dogs.

In testimony whereof I have signed my name to this specification.

WILLIAM C. NABORS.